(12) United States Patent
Hulme (10) Patent No.: US 11,589,423 B2
(45) Date of Patent: Feb. 21, 2023

(54) UNIVERSAL HEATING POWER MANAGEMENT SYSTEM

(71) Applicant: Evoqua Water Technologies LLC, Pittsburgh, PA (US)

(72) Inventor: Clinton W. Hulme, Pennsburg, PA (US)

(73) Assignee: Evoqua Water Technologies LLC, Pittsburgh, PA (US)

(*) Notice: Subject to any disclaimer, the term of this patent is extended or adjusted under 35 U.S.C. 154(b) by 266 days.

(21) Appl. No.: 16/755,774

(22) PCT Filed: Oct. 16, 2018

(86) PCT No.: PCT/US2018/056063
§ 371 (c)(1),
(2) Date: Apr. 13, 2020

(87) PCT Pub. No.: WO2019/079283
PCT Pub. Date: Apr. 25, 2019

(65) Prior Publication Data
US 2020/0329532 A1    Oct. 15, 2020

Related U.S. Application Data

(60) Provisional application No. 62/573,467, filed on Oct. 17, 2017.

(51) Int. Cl.
*C02F 1/02* (2006.01)
*H05B 1/02* (2006.01)
(Continued)

(52) U.S. Cl.
CPC .......... *H05B 1/0297* (2013.01); *C02F 1/008* (2013.01); *C02F 1/02* (2013.01); *C02F 1/441* (2013.01);
(Continued)

(58) Field of Classification Search
USPC ................................................. 210/636, 750
See application file for complete search history.

(56) References Cited

U.S. PATENT DOCUMENTS

| 4,166,031 A | 8/1979 | Hardy |
| 5,591,344 A | 1/1997 | Kenley et al. |

(Continued)

FOREIGN PATENT DOCUMENTS

| CN | 205999072 U | 3/2017 |
| FR | 2465983 | 3/1981 |

(Continued)

OTHER PUBLICATIONS

"Mar Cor Purification Introduces the Millenium HX," Mar Cor Purification, 3027803 Rev. A, 2 pp., 2012.
(Continued)

*Primary Examiner* — Jonathan Miller (57) ABSTRACT

A heat power management system is disclosed for an alternating current (AC) power controller for use with portable reverse osmosis water purification systems requiring precise control of a heating action for an internal water heater coupled with energy savings and the reduction of AC line disturbances. The heat power management system is designed to operate with various international electrical systems while protecting such system from excessive current draws.

8 Claims, 10 Drawing Sheets

(51) Int. Cl.
 *C02F 1/00* (2023.01)
 *C02F 1/44* (2023.01)
 *C02F 103/02* (2006.01)
(52) U.S. Cl.
 CPC .... *C02F 2103/026* (2013.01); *C02F 2209/02* (2013.01)

(56) References Cited

U.S. PATENT DOCUMENTS

| | | |
|---|---|---|
| 6,099,735 A | 8/2000 | Kelada |
| 6,246,831 B1 | 6/2001 | Seitz et al. |
| 6,861,033 B2 | 3/2005 | Mullins et al. |
| 7,210,601 B2 | 5/2007 | Hortin et al. |
| 8,064,233 B2 | 11/2011 | Ishizu et al. |
| 8,506,885 B2 | 8/2013 | Kotsos et al. |
| 8,692,167 B2 | 4/2014 | Hedmann et al. |
| 9,151,516 B2 | 10/2015 | Buescher et al. |
| 9,322,258 B2 | 4/2016 | Henson et al. |
| 9,358,331 B2 | 6/2016 | Fulkerson et al. |
| 9,768,783 B1 | 9/2017 | Schmit et al. |
| 9,975,090 B2 | 5/2018 | Hoffman |
| 10,099,179 B2 | 10/2018 | Volker |
| 10,159,939 B2 | 12/2018 | Volker |
| 10,207,225 B2 | 2/2019 | Lutz et al. |
| 10,246,351 B2 | 4/2019 | Völker |
| 10,668,201 B2 | 6/2020 | Wrazel et al. |
| 2002/0100716 A1 | 8/2002 | Bosko |
| 2003/0034305 A1 | 2/2003 | Luehmann et al. |
| 2007/0102357 A1 | 5/2007 | Weatherill |
| 2014/0151297 A1* | 6/2014 | Hulme .................. B01D 65/02 210/636 |
| 2015/0027937 A1 | 1/2015 | Katou et al. |
| 2015/0273090 A1 | 10/2015 | Felding et al. |
| 2018/0236156 A1 | 8/2018 | Glaser |
| 2019/0083934 A1 | 3/2019 | Moon et al. |
| 2019/0282929 A1* | 9/2019 | Shelton ................ H05B 1/0244 |
| 2019/0299163 A1 | 10/2019 | Kim et al. |
| 2019/0387795 A1* | 12/2019 | Fisher .................. H02J 7/0029 |
| 2020/0000146 A1* | 1/2020 | Anderson ........... H01R 13/6205 |
| 2021/0268206 A1* | 9/2021 | Hatton .................. A61M 11/00 |
| 2022/0126696 A1* | 4/2022 | Jeannard ................ B60L 3/003 |
| 2022/0127176 A1* | 4/2022 | Massone .................. C02F 1/04 |

FOREIGN PATENT DOCUMENTS

| | | |
|---|---|---|
| WO | 99/55448 | 11/1999 |
| WO | 03/40042 | 5/2003 |
| WO | 2007/045015 | 4/2007 |
| WO | 2015/100502 | 7/2015 |
| WO | 2016/086737 | 6/2016 |
| WO | 2017/171406 | 10/2017 |
| WO | 2017/218932 | 12/2017 |
| WO | 2018/036753 | 3/2018 |

OTHER PUBLICATIONS

"Miilenium HX: Portable Water Purification System w/ Automatic Hot Water Disinfection," Mar Cor Purification, 3027573 Rev. C, 2 pp., 2012.

"Purification Millenium HX Reverse Osmosis Unit Operation and Maintenance Manual," Mar Cor Purification, 3026177 Rev. B, 154 pp., Apr. 16, 2012.

Gambro, WRO 300 Operator's Manual, Sep. 2010, pp. 11, 22 and 24 (accessed on Oct. 14, 2016 at https://www.manualslib.com/manual/439580/Gambro-Wro-300-H.html).

International Search Report and Written Opinion of the International Searching Authority dated Dec. 13, 2018 of International PCT Application No. PCT/US2018/56049 filed Oct. 16, 2018.

International Search Report and Written Opinion of the International Searching Authority dated Feb. 12, 2019 of International PCT Application No. PCT/US2018/56063 filed Oct. 16, 2018.

International Search Report and Written Opinion of the International Searching Authority dated Jan. 4, 2019 of International PCT Application No. PCT/US2018/56059 filed Oct. 16, 2018.

International Preliminary Report on Patentability of the International Searching Authority dated Apr. 30, 2020 of International PCT Application No. PCT/US18/56063 filed Oct. 16, 2018.

International Preliminary Report on Patentability of the International Searching Authority dated Apr. 30, 2020 of International PCT Application No. PCT/US18/56049 filed Oct. 16, 2018.

International Preliminary Report on Patentability of the International Searching Authority dated Apr. 30, 2020 of International PCT Application No. PCT/US18/56059 filed Oct. 16, 2018.

* cited by examiner

UNIVERSAL HEATING POWER MANAGEMENT SYSTEM

CLAIM OF PRIORITY

This application claims priority to and the benefit of U.S. Provisional application with Ser. No. 62/573,467, filed on Oct. 17, 2017, entitled UNIVERSAL HEATING POWER MANAGEMENT SYSTEM, which is herein incorporated by reference in its entirety.

CROSS-REFERENCE TO RELATED APPLICATIONS

This application relates to U.S. Patent Publication No. 2014/0151297, filed on Nov. 27, 2013, and entitled "Portable Reverse Osmosis Water Purification System," the disclosure of which is incorporated by reference in its entirety.

TECHNICAL FIELD

The present disclosure relates to power line conditioning modules and heat modulating that may be used with water purification systems.

BACKGROUND

Power line conditioning systems and circuits are used regularly with systems connected to the AC power grid and are tailored to reduce energy disturbances on the connected AC grid. Systems that draw on AC power grid may also cause damage or frequent interruptions to these power delivery systems where the current draws may be too high leading to AC line distortions. Finally, portable systems that may be used in different parts of the US and the world will be exposed to variations in voltage and operating frequency. These variations may adversely affect the underlying device that is connected to such an AC power source.

With the increasing demand for portable heat sanitizing RO filtration systems and the demand for such devices in global markets, it is frequently too expensive for manufacturers to have two sets of devices for operation on each of the major global power systems. Other purification systems including drinking water purification, wastewater purification, and water purification for health care uses (e.g., dialysis systems) can also benefit from portability and power line flexibility.

It would be highly advantageous to the market to provide an AC power line conditioning system and module for use in portable RO devices with the capability to compensate for variations or drastic changes in city or country AC distribution grids/power systems.

SUMMARY

The present disclosure relates to power line conditioning modules and heat modulating that may be used with, but are not necessarily limited to, water purification systems. More specifically, the present disclosure relates to an alternating current (AC) power controller for use optionally with portable reverse osmosis (RO) water purification systems. The various embodiments described herein provide for an AC power controller for use optionally with portable reverse osmosis water purification systems that require precise control of a heating action for an internal water heater but provide the advantages of energy savings and the reduction of AC line disturbances. Generally there is provided a power line conditioning module and method for controlling a heating function and for controlling the power consumed by the heating function from an AC external power source with either a base line voltage of 120V or 230V and a line frequency of either 60 Hz or 50 Hz without the need to communicate with or adjust an underlying device or system that is electrically coupled to the power line conditioning module. The method includes the steps of first automatically determining the line voltage and frequency applied to a defined load or, in this case, the heating elements. Secondly, the method includes controlling an amount of power provided to a heater element by varying a current draw to protect the external power source from excessive current draw and voltage distortions while providing for/maintaining proper heating operation throughout all AC power supply conditions.

In one example embodiment, an AC line heat power management system is provided for controlling and limiting a total power applied in a heating function of a heating element, having a predefined watt rating, from an external AC power source having a line voltage, a line frequency and a drive voltage waveform. The heat power management system includes a safety contactor relay assembly electrically coupled to the external AC power source and an AC line power management circuit electrically coupled to the safety contactor relay assembly. The AC line heat power management circuit includes a processor module electrically coupled to the external AC power source and configured to sense the AC line frequency, line voltage and the AC current waveform when the safety contactor is being energized, with the heat power circuit controlling the AC voltage waveform to be applied to the heating element. The heat power management system further includes a master heating process controller electrically coupled and configured to provide control signals to the power management circuit and to the safety contactor relay assembly, the master heating process controller configured to provide a system control percent drive waveform signal to the power management circuit which determines the amount of power provided to the heating element. In one example embodiment, a solid-state power relay is provided that is electrically coupled to the power management circuit and to the safety contactor relay assembly and having an output electrically coupled to the heating element. The solid-state power relay receives and provides a line frequency synchronized signal to the heating element. In this example embodiment, the power management circuit is configured to automatically sync the AC power source line frequency and the control percent drive signal so as to control with the heating process controller the drive signal to the heating element via the solid state power relay, the heating process controller and the solid state power relay being configured to control and limit power applied to the heating element. In a related embodiment, the solid state power relay is substituted for a solid state power controller.

In a related example embodiment, there is provided an alternating current (AC) line heat power management system for controlling and limiting a total power applied in a heating function of a heating assembly, having a predefined watt rating, from an external AC power source having a line voltage, a line frequency and a drive voltage waveform, the heat power management system including a safety contactor relay assembly electrically coupled to the external AC power source. The power management system also includes an AC line power management circuit electrically coupled to the safety contactor relay assembly, the AC line heat power management circuit including a processor module and a power module electrically coupled to the external AC power source and configured to sense the AC line frequency, line voltage and current, and an AC voltage waveform when the safety contactor is being energized, the line power management circuit configured to provide a line frequency synchronized signal and control the AC voltage waveform to be applied to the heating assembly. The power management system further includes a master heating process controller electrically coupled and configured to provide control signals to the power management circuit and to the safety contactor relay assembly, the master heating process controller configured to provide a system control percent drive waveform signal to the power management circuit which determines the amount of power provided to the heating element, with the power module being configured to control the AC voltage waveform so as to reduce harmonics and flicker in the voltage waveform to be applied to the heater assembly.

In a related embodiment, in the power management system disclosed above the heating assembly includes a constant power heater element and a variable power heater element that receives the AC voltage waveform from the power module.

In another example embodiment, there is provided a method for controlling a heating function of a sanitizing system for a RO system and controlling a line voltage and line frequency supplied thereto from an external power source. The method includes the step of automatically converting the line voltage and frequency to a defined requirement of a load of the sanitizing system and providing DC voltage to a part of the sanitizing system via a contactor and relay coupled to the external power source. Thereafter, the method causes a programmable logic controller (PLC) to control amount of power provided to a heater for heating purified water by varying a voltage applied to a heat element resistance of the heater to thereby control a current draw to protect the external power source.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DESCRIPTION OF THE PREFERRED EMBODIMENTS

Although the teachings of the various embodiments of the present disclosure are provided in a context of reverse osmosis and other water purification systems, the various embodiments of power management circuits and systems are not limited to these water purification applications and to heat forward process applications. This disclosure is applicable to those applications in need of power line conditioning and the conversion and the control of a heating element load or a media heating functional device. The power line management circuit described in further detail has applications in RO systems that do not have the heat forward capability or with water purification systems that are in need of reliable uninterrupted water supply systems and with reliable power line conditioning capabilities.

Figure 1A:
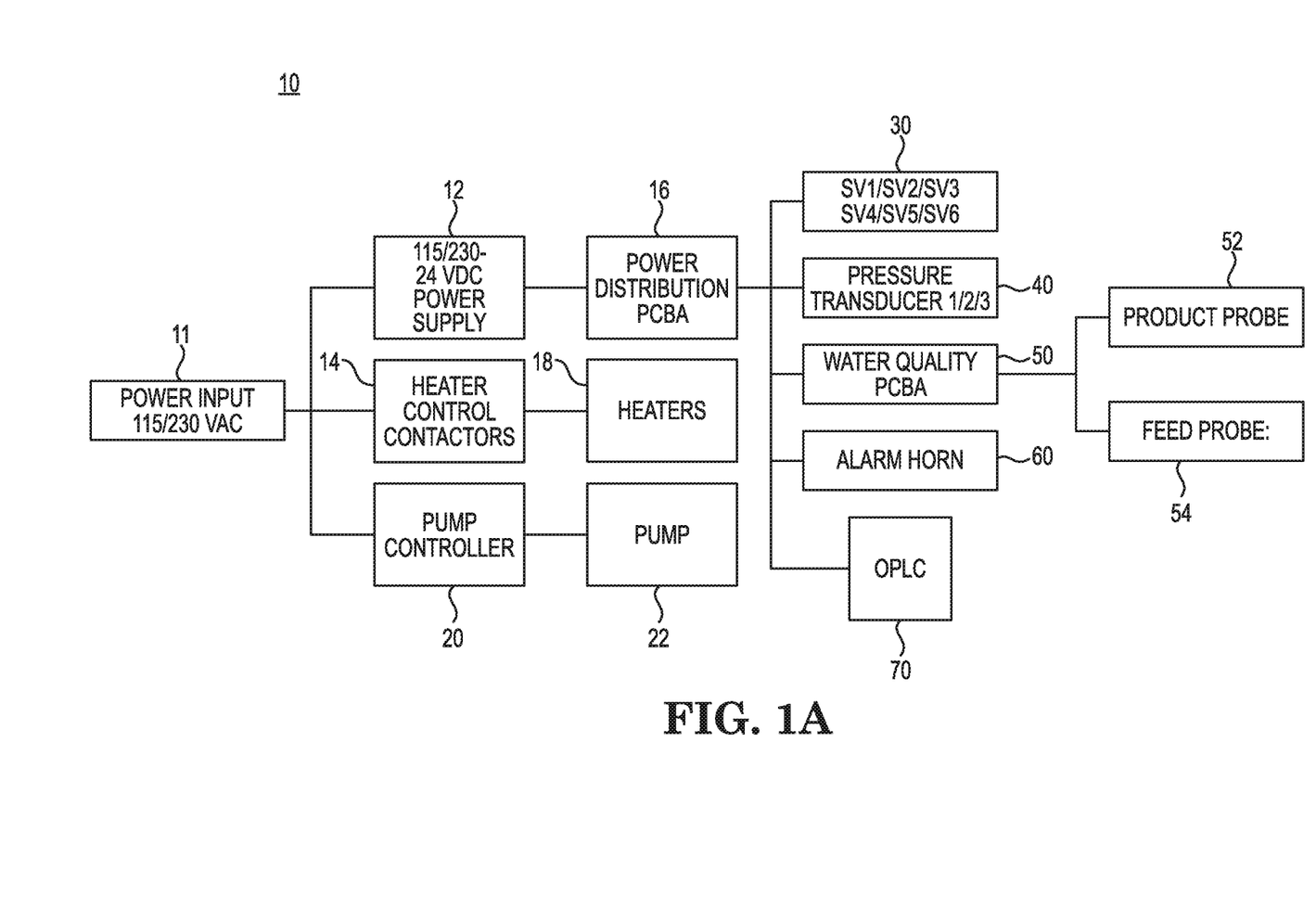
FIG. 1A is an electrical schematic block diagram of an embodiment of a RO water purification system using a heat power management system.
Figure 1B:
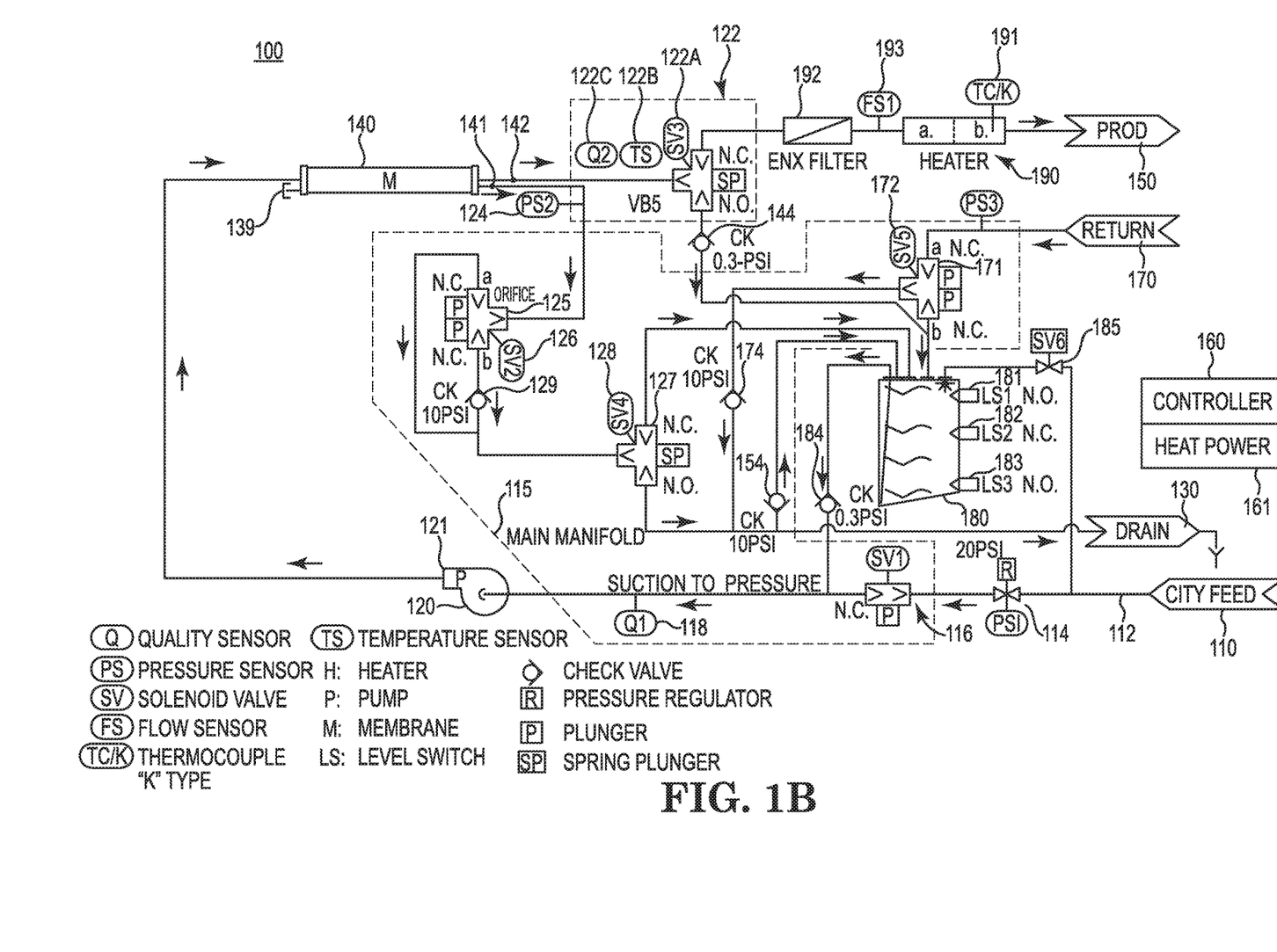
FIG. 1B is a schematic view of an embodiment of a RO purification system and associated water flows using a heat power management system described herein.

Referring now to the Figures, FIG. 1A and FIG. 1B illustrate an electrical and a water flow system schematic, respectively, of an embodiment of a RO based water purification system having a heat power management system optionally used in a heat forward process for sanitizing an external device. In particular, an electrical system 10 of an RO system is connected to an alternating current (AC) power source 11 providing a 115/230V alternating current to a power supply 12 which converts the current to a 24V direct current power supply that powers a power distribution module 16 (in the form of a printed circuit board). Source 11 also powers heat control contactors 14, which power and control heaters 18 and a pump controller 20, which in turn controls a pump 22. Power distribution module 16 controls in an RO system the following: a series of solenoid valves 30, which control water flow through the RO system, controls power transducers 40, a water quality module 50, an alarm horn 60 and a programmable logic controller (PLC) 70. Water quality module 50 in turn is operatively coupled to a product water probe 52 and a feed water probe 54. In this example embodiment, power distribution module 16 is also communicatively coupled to heat contactors 14, heaters 18 and to PLC 70, which will be described in more detail in connection with FIGS. 2A and 2B hereinafter.

Referring now to FIG. 1B, there is illustrated a water flow schematic of an RO system 100 that purifies water provided by a feed water supply 110 (by way of reverse osmosis) for use in various applications, such as hemodialysis. The system 100 possesses monitoring for feed water pressure, feed water quality, feed water temperature, pump outlet pressure, product water pressure, product water temperature, product water quality, and membrane performance (percent rejection). A variable frequency pump 120 provides the pressure required to push water through the RO membrane 140 and against a fixed orifice. Fluid controls along with a controller 160 and a heat power management module 161 provide a means of managing flow rates and pressures as well as heating of purified water for sanitizing system components and providing a heat forward sanitizing capability. In particular, RO system 100 provides for sanitizing with heated purified water the RO system having an inlet 112 for receiving potable water from an external (city) potable feed water supply 110 and an internal storage tank 180 for storing purified water. The RO system also includes at least one RO membrane unit 140 that receives water from potable feed water supply 110 and which purifies the water and delivers the purified water through a delivery conduit 142 and eventually provides purified product water at product water outlet 150. In this example embodiment, membrane 140 is an assembly that includes a membrane cartridge housed in a membrane housing with end caps and O-rings capable of providing up to 1500 mL/minute of product water. RO system 100 also includes a return outlet 170 for directing excess or unused product water to storage tank 180 or to a drain outlet 130. Drain outlet 130 can also receive waste water from membrane 140 via conduit 141. The drain output 130 may be connected to a receptacle or other system for proper disposal of the drain fluid.

In this example embodiment, controller module 160 activates a heat sanitizing cycle within the sanitizing system that is programmed to operate the components of the system 100 to provide various functionalities (e.g., water purification, sanitization, etc.). Controller module 160 further includes a heating power management control module/circuit 161 programmed to isolate part of RO system 100 and to drive heated sanitized purified water solely through to an inlet of an external heat tolerant device, such as a dialysis machine or other heat tolerant devices, or through a heat tolerant section or portion of an overall system (not shown). In one example embodiment, an external connection section (and an extension hose) in a dialysis machine for connection with an RO system can be cleaned and sanitized with a heat forward process described herein. Briefly, the heated purified water is directed to the non-sterilized external connection section, with the right temperature, time and pressure, to thoroughly clean and sanitize the connection section. Such cleaning/sanitization can now be advantageously performed without the need for establishing a line of communication between the RO system and the dialysis unit (as required in other prior art systems) or without the need to introduce a chemical cleaner or process that would require further rinsing after chemical disinfection and before patient use, as system 100 is in control of all fluid flowing out from RO system 100.

Figure 1C:
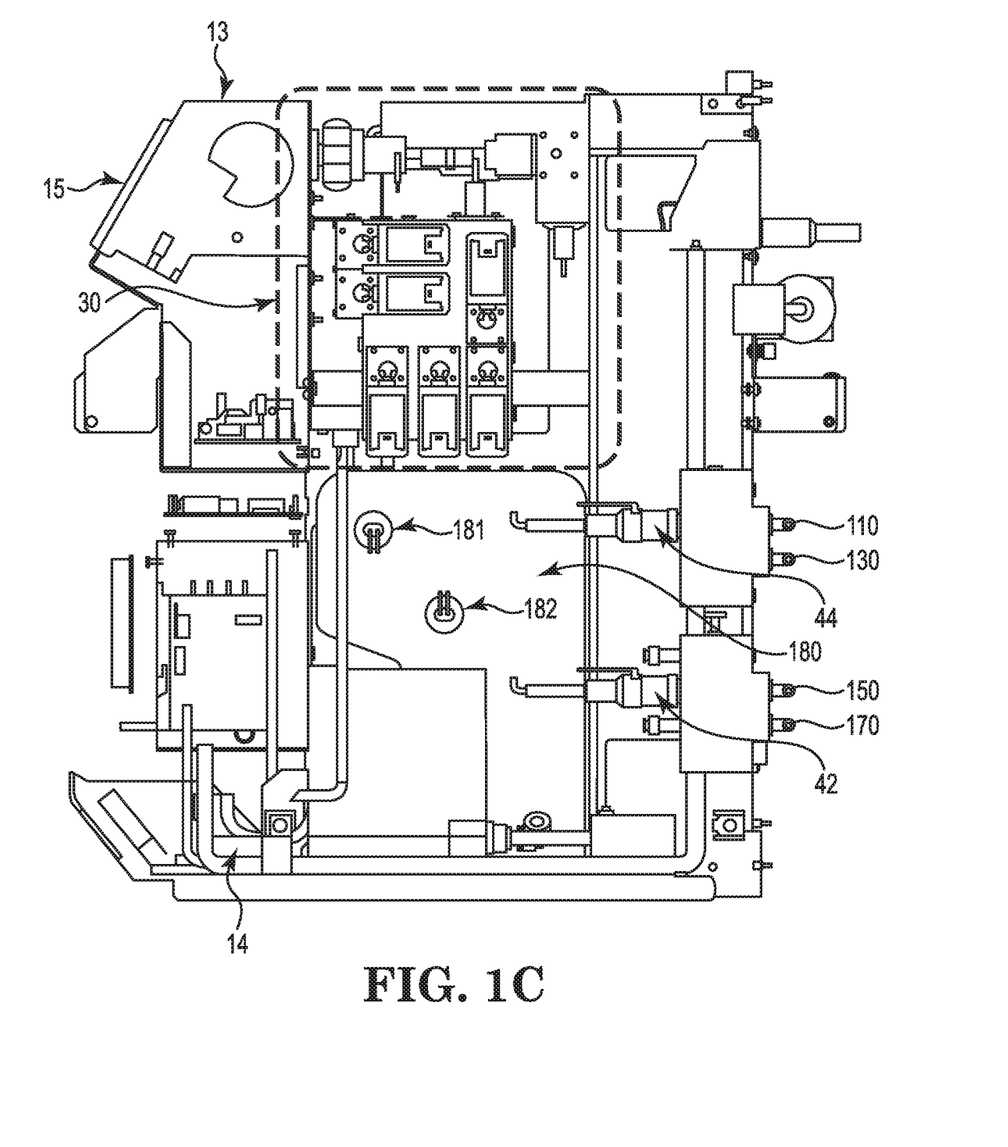
FIGS. 1C, 1D and 1E are right, inset and left views of an RO module according to the teachings of the invention.
Figure 1D:
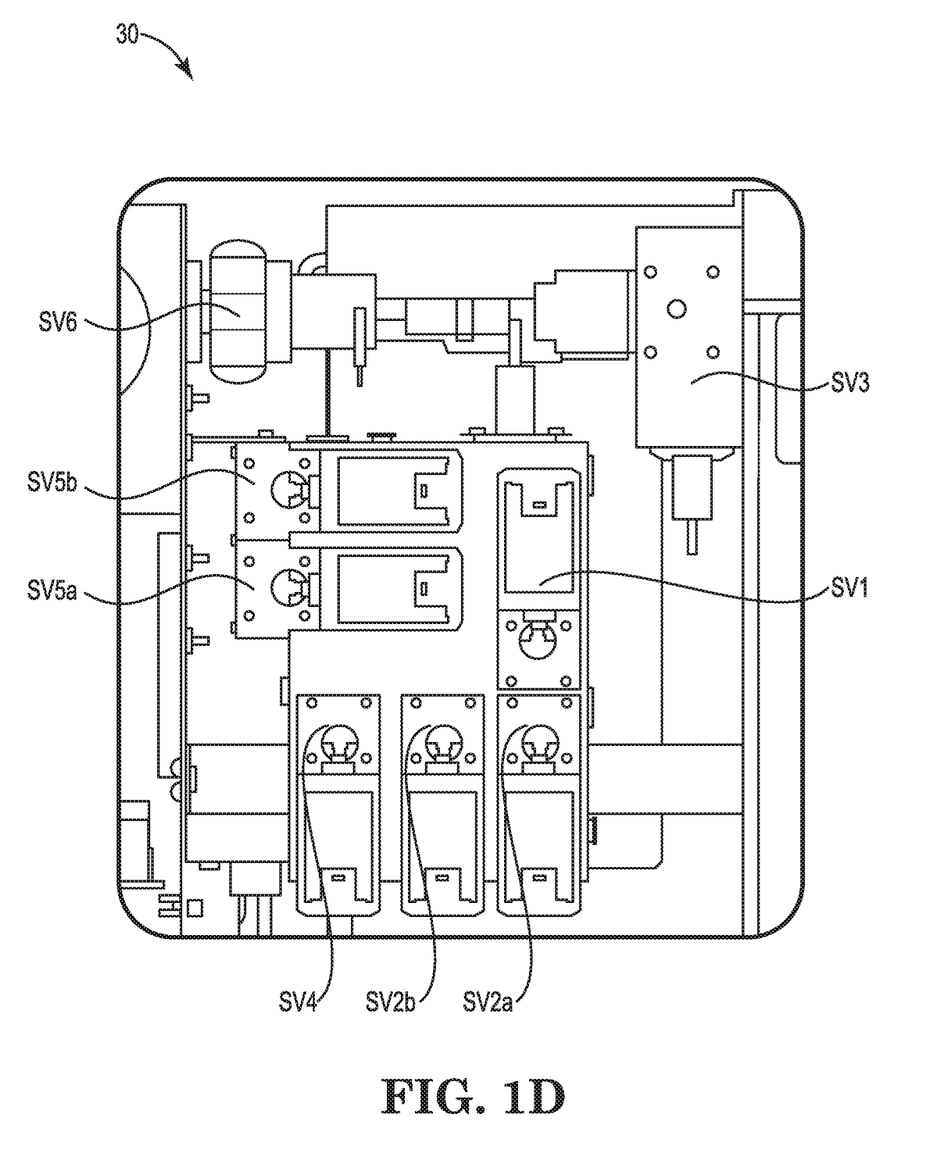
Figure 1E:
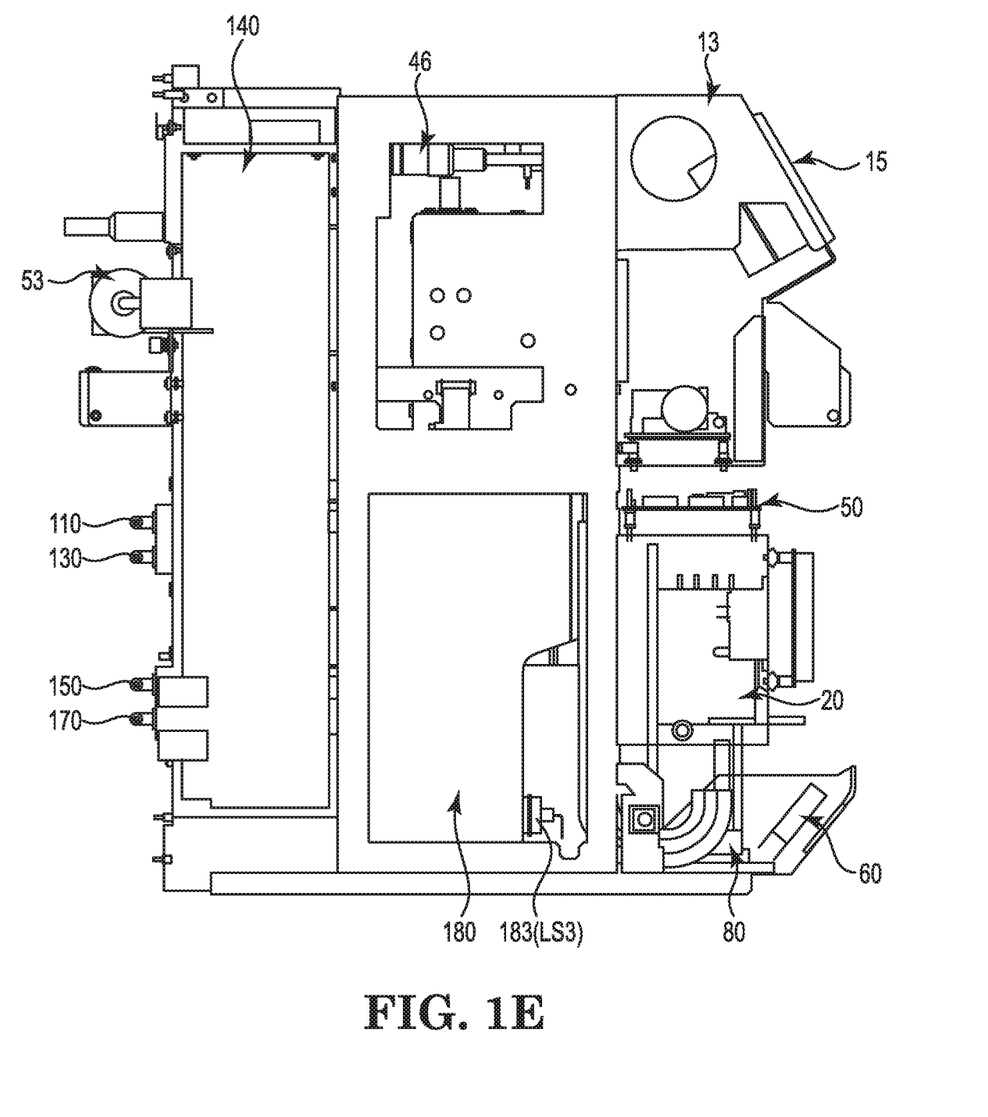

Referring now to FIGS. 1C-1E, there is illustrated RO system 10 and 100 embodied within a housing 13 having a keypad/display (GUI) 15 electrically coupled to programmable logic controller (such as PLC 70 of FIG. 1). A right side electrical view of system 10 shown in FIG. 1C illustrates that disposed within housing 13 are a bank of solenoid valves 30 (SV1-SV6), an internal tank 180, a feed water transducer 44, a product water pressure transducer 42, a pump pressure transducer 46, and water level switches 181 (LS1) and 182 (LS2) which are integrated with tank 180 for measuring various levels of the internal tank water. FIG. 1D illustrates a plurality of solenoid valves 30, discussed in more detail later in the specification, which are controlled by controller 160 and in turn control the flow of various fluids throughout RO system 10/100. RO system 10 further includes a series of inlet and outlet ports including a feed port 110, a drain port 130, a product port 150 and a return port 180. A water source is attached to feed port 110 with a QD fitting for the introduction of water into the RO housing 13 and has a check valve that closes when there is no line connected to the fitting. Product port 150 is attached by a push-in fitting for the output of product water. Waste or drain port 130 is located on the rear of the RO housing 13 and hose/conduit is attached by a push-in fitting for the output of concentrate or waste fluid to the drain. Return port 180 is located on the rear of RO housing 13 and is attached to a conduit via a push-in fitting for the return of product water to the unit 10.

RO system 10 also includes a series of conductivity sensors (Q), which include RO feed water conductivity sensor Q1, which monitors the quality and temperature of the inlet water to the pump. Inlet water quality and temperature can be viewed from an ANALOG screen. The value is compared to the product water quality reading to calculate the percent rejection. This sensor is temperature compensated. Product water conductivity sensor (Q2) monitors the quality and temperature of the water after it exits membrane 140. Product water quality can be viewed from a RUN screen (on the display on the unit) during normal operation and the value is compared to the inlet water quality reading to calculate the percent rejection. Temperature can also be viewed from the ANALOG screen and this sensor is temperature compensated. RO feed water pressure sensor (PS1) monitors the incoming water pressure to the RO machine 10 and will shut down the machine if there is low or high RO feed water pressure. The feed water pressure is viewable from the ANALOG screen. Pump outlet pressure sensor (PS2) monitors the output of pump 120 and will shut down the RO system if an overpressure or under-pressure condition is sensed. The pump outlet pressure is viewed from the RUN screen and can also be viewed from the ANALOG screen. Pressure sensor PS3 monitors the product water pressure and will shut down the RO system if an overpressure condition is detected. The product water pressure is viewed from the RUN screen and can also be viewed from the ANALOG screen. Pressure Regulator (PR) controls the incoming feed pressure to the RO when solenoid valve SV1 (described below) is open. Flow Sensor FS1 or switch 193 monitors the flow of product water from the membrane 140, thereby displaying flow on the RUN screen or the ANALOG screen. Thermocouple (TC/F) 191, which is located near the heater 190, monitors the temperature of the water exiting the heater. The temperature is displayed on the RUN screen and can also be viewed from the ANALOG screen.

FIG. 1E illustrates an electrical left side view of system 10 shown in housing 13, which includes an RO assembly 140, a Nephros filter 53 located adjacent assembly 140, a water quality PCB 50, a pump controller 20, a tilt sensor 80 and an alarm horn 60. Although not shown here, system 10 also includes a series of check valves which work in conjunction with the solenoid valves 30 to control fluid flow within RO system 10. In this example embodiment, the series of solenoid valves and check valves facilitate more precise control of heating and cooling throughout the RO system, hence a further detailed description will follow in connection with both FIGS. 1A and 1B. Solenoid valve (SV1) 116 is a rinse water solenoid that is normally a closed valve used during the purge, rinse and a heat forward process. It is opened if there is not enough water in the internal water tank during normal dialysis operation. Solenoid valve (SV2) 126 is a waste water valve assembly that includes has two solenoids (SV2a-126a and SV2b-126b). During normal dialysis operation SV2a is closed and water flows through the orifice hole within body 125. The valve is open during flushing, chemical and heat disinfection processes. On the other hand, solenoid valve SV2b opens during the heat forward to provide a specific amount of backpressure on the membrane. Solenoid valve (SV3) 122A is a product water solenoid that is normally closed. During startup, the water flow is diverted. Once the product quality improves below the product water quality alarm, it opens and supplies water to the product line 150. Solenoid valve (SV4) 128 is a waste recycle control solenoid which is a 3-way valve that directs waste flow to the drain of the RO system or to the tank 180. This valve 128 can recycle waste water into the internal tank when the RO system is set up for the water saver function. Solenoid valve (SV5) 172 is a product water return solenoid valve having two solenoids: a) solenoid SV5a provides backpressure during normal operation of the RO system allowing it to supply product water at a pressure of approximately 30 PSI. During heat and chemical modes, this valve is open allowing full flow for proper operation; and b) solenoid SV5b allows product water to flow to the storage tank or flow direct to the drain. Finally, solenoid (SV6) 185 is an inlet water solenoid valve which provides feed water to the internal storage tank 180 during operation of the RO system during Chemical Rinse, Heat Forward and Normal dialysis processes.

Referring now to the series of check valves that operate with solenoid valves 30 and controller 160, check valve CK1, which is located on the waste side of the membrane, provides backpressure during the Heat Forward process. Check valve CK2, which is located between the drain line and solenoid valve SV5, prevents waste water from entering the product line 150. Check valve CK3, which is located between internal tank 180 and drain 130, will divert water to the storage tank 180 if the drain line is obstructed. Check valve CK5, which is located in the tank outlet path to the pump 120, prevents RO feed water 110 from being fed into internal tank 180.

In this example embodiment, RO system 100 also includes a variable frequency drive (VFD) pump 120 that is coupled to an RO membrane unit inlet 139 and that is communicatively coupled to controller module 160. Pump 120 generally controls the fluid pressure through RO system 100 and generally controls water pressure input to membrane 140. In some embodiments, pump 120 maybe a pump other than a VFD pump and has a pump pressure of about 160-200 pounds per square inch (psi) (1.10-1.24 MPa). In some embodiments, a pump includes a pressure sensor used to control the operation of VFD pump 120 so as to shut down system 100 if an overpressure condition is detected. In this example embodiment, VFD pump 120 is designed to operate at a first pumping rate until an average feed water supply temperature and pressure (provided by city feed 110) is determined and once an appropriate predefined temperature and pressure is achieved then transitioning to a second pumping rate. VFD pump is further designed to draw water from storage tank 180 to stabilize VFD pump 120 from pressure fluctuations in external feed water supply 110. RO system 100 further includes a solenoid valve and manifold assembly 115 that is communicatively coupled to controller module 160 and to VFD pump 120, the main manifold being configured to control flow of feed water supply 110 via line 112 and the purified water provided by membrane unit 140 via delivery conduit or outlet 142.

During a normal water purification cycle, the solenoid valve 116 (and valve 184) cycles depending on the level of water in the tank 180. During heating and chemical sanitization modes of operation, described in more detail below, the solenoid valve 116 operates to isolate the pump 120. The quality sensor 122C and temperature sensor 122B monitor the quality and temperature of the product water, respectively, after the pure product water exits membrane 140. The product water quality measured by the quality sensor 122C can be reviewed (e.g., on a screen associated with the system 100) during normal operation. The input of a check valve 144 is connected between the output of the membrane 140 via the valve body 122A, and an output of check valve 144 is connected to the input of internal tank 180. Check valve 144 is used to prevent backflow of water in internal tank 180 into the product water provided to the product water output 150. The check valve 144 also provides a pressure regulation for the line from membrane 140 to the product water output 150. In another part of the system, a solenoid valve 172 provides fluid flow resistance during normal operation to the unused product water returning from the external connection 170. Check valve 174 is used to prevent backflow of water into internal tank 180 and into return water input 170. In some embodiments, the solenoid valve 172 provides a backpressure to maintain the product water at a pressure of approximately 35 psi (0.241 MPa). Check valve 184 is used to prevent backflow of water into internal tank 180 and into city feed water supply 110. Check valve 154 is used to prevent backflow of water into internal tank 180 and into drain output 130.

Internal tank 180 receives water from check valve 144 and/or the return input 170. The level of the fluid in internal tank 180 is measured by the level sensors 181, 182 and 183. The level sensor 181 is triggered when water in tank 180 is at or above a maximum water level, level sensor 182 is triggered when water in tank 180 is at or below an intermediate water level, and the level sensor 183 is triggered when the water in tank 180 is at or below a minimum water level. Check valve 184 is at an outlet of tank 180 and prevents pump 120 feed water from being fed back into tank 180. Check valve 174 is connected between drain output 130 and is configured to relieve pressure in the drain line when the drain output 130 is not connected or not functional. A solenoid valve 185 is controllable to prevent backflow of water in internal tank 180 into city feed water input 110.

In in this example embodiment, RO system 100 includes a low flow velocity sensor assembly 193 that senses fluid flow through an inline heater element 190 and is also communicatively coupled to controller module 160 and VFD pump 120 that is configured to initiate VFD pump stabilization should there be fluctuations in water pressure from city feed 110. Inline heating element 190 includes an integral thermal sensor 191 that quickly raises the temperature of RO water provided by VFD pump 120 and membrane 140 to a desired first temperature before moving through Product port 150. Unlike previous RO systems that have had the heater element located in the storage tank, moving the heater element out of the storage tank facilitates precise control of the temperature of the purified product water being delivered by RO system 100 and reduces power requirements as only the water that is needed is heated and not the entire storage tank 180 as in other RO systems. To increase water quality and ensure a sufficient water supply before heating the purified water, an inline filter 192 is incorporated into the product water line just before heater element 190. RO system 100 also includes a high flow pressure regulating control valve that is communicatively coupled to controller module 160 and which regulates water pressure from an outlet 121 of the VFD pump 120 flowing into RO membrane unit 140. Output 141 of membrane 140 is connected to a solenoid valve body 126 (via a waste output 141) and output 142 is connected to a valve body 122, respectively. The solenoid valve 126 of a valve body 125 allows drain water from the output of membrane 140 to pass through during normal operation while a check valve 129 helps to prevent water backflow from the storage tank.

During a heat sanitization process, solenoid valve 126 opens to help maintain system 100 at a predetermined pressure during the sanitization process. Valve bodies (with their associated solenoid valves) such as 116, 123, 125, 127 and 171, for example, are configured to control flow rates and pressures in the system 100.

In operation, a purified water flow control system as part of RO system 100 supplies and regulates the purified water flow as well as activates a heating power application system from the heat power module 161. Heater element 190 applies heat to the purified water flow and delivers a heat sanitizing purified water flow continuously through to the inlet of the external heat tolerant device, such as a dialysis machine. In operation, variable frequency drive (VFD) pump 120 that is operatively coupled to the internal storage tank 180 is initiated and operates at a first pumping rate until an average feed water supply temperature and a purified water flow rate is determined and then pump 120 transitions to a second pumping rate. VFD pump 120 stabilization is initiated as a flow volume measuring sensor 193 coupled to the purified water flow is triggered upon sensing a water flow being below a predefined level. When system 100 is not in the break tank mode (and tank 180 is isolated), pump 120 provides a regulated flow of purified water by stabilizing VFD pump 120 from water pressure fluctuations by drawing water from the external potable water supply 110 and directing it to membrane 140.

In one example embodiment, controller 160 initiates raising the temperature of the regulated purified water flow provided by VFD pump 120 via the internal inline heater element to a predefined level above a fixed minimum temperature for sanitizing the external heat tolerant device. In a related embodiment, controller 160 varies the amount of applied power to a direct contact inline heating element assembly with an integral thermal sensor disposed within a purified water heating chamber as a function of a sensed purified water temperature. Controller 160 further regulates the purified and heated water flow and pressure into and out of the inlet of the external heat tolerant device and monitors the water temperature so as to increase or decrease a VFD pump rate to maintain the water temperature at a defined level. Controller 160 also regulates a back pressure of the supplied heated purified water via a system control of internal flow directing check valves and assists in the collection of a redirected flow of heated purified water and unused heated purified water into internal storage tank 180.

Controller 160 provides various operating modes to compensate for a reduction in heated purified water flow in the RO system. Upon sensing a reduction in heated purified water flow below a predetermined level, controller 160 initiates controlling heated purified water flow and temperature within a heating chamber by opening multiple valves on a return side of the heated water flow and increasing the VFD pump rate so as to increase heated water flow velocity. In the instance where the heated purified water temperature fluctuates above or below a defined temperature range, controller 160 initiates adjusting heating power values up or down for a predetermined time and then further monitors a number of water temperature fluctuations above and below the defined temperature range during a defined time period when the number of fluctuations exceeds a defined number during a defined time. Controller 160 also allows the user to manually activate an exit process of the RO system 100 thereby automatically turning off the heating element, emptying the storage tank and cooling water flow paths and returning RO system to an idle mode.

In a related embodiment, controller 160 initiates activating a heating power application system of heat power controller 161 including a heating device configured to apply heat to the purified water flow and configured to deliver a heat sanitizing purified water flow continuously through to the external heat tolerant device and initiating a variable frequency drive (VFD) pump coupled to the internal storage tank to operate at a first pumping rate until an average feed water supply temperature and a purified water flow rate is determined and then transitioning to a second pumping rate and providing a regulated flow of heated purified water by increasing or decreasing the VFD pumping rate as a function of water temperature fluctuations in the external potable water supply. Controller 160 controls the flow of the purified water in RO system 100 before activating the heating of the purified water to be delivered continuously and in a stable state to the external device. Upon the heated purified water temperature fluctuating above or below a defined temperature range, heating power values are adjusted up or down for a predetermined time and then further monitoring is initiated of the number of water temperature fluctuations above and below the defined temperature range during a defined time period when the number of fluctuations exceeds a defined number during a defined time. In one example embodiment, controller 160 assists in operating RO system 100 with low inlet pressure from the external feed water supply without shutting down.

Figure 2A:
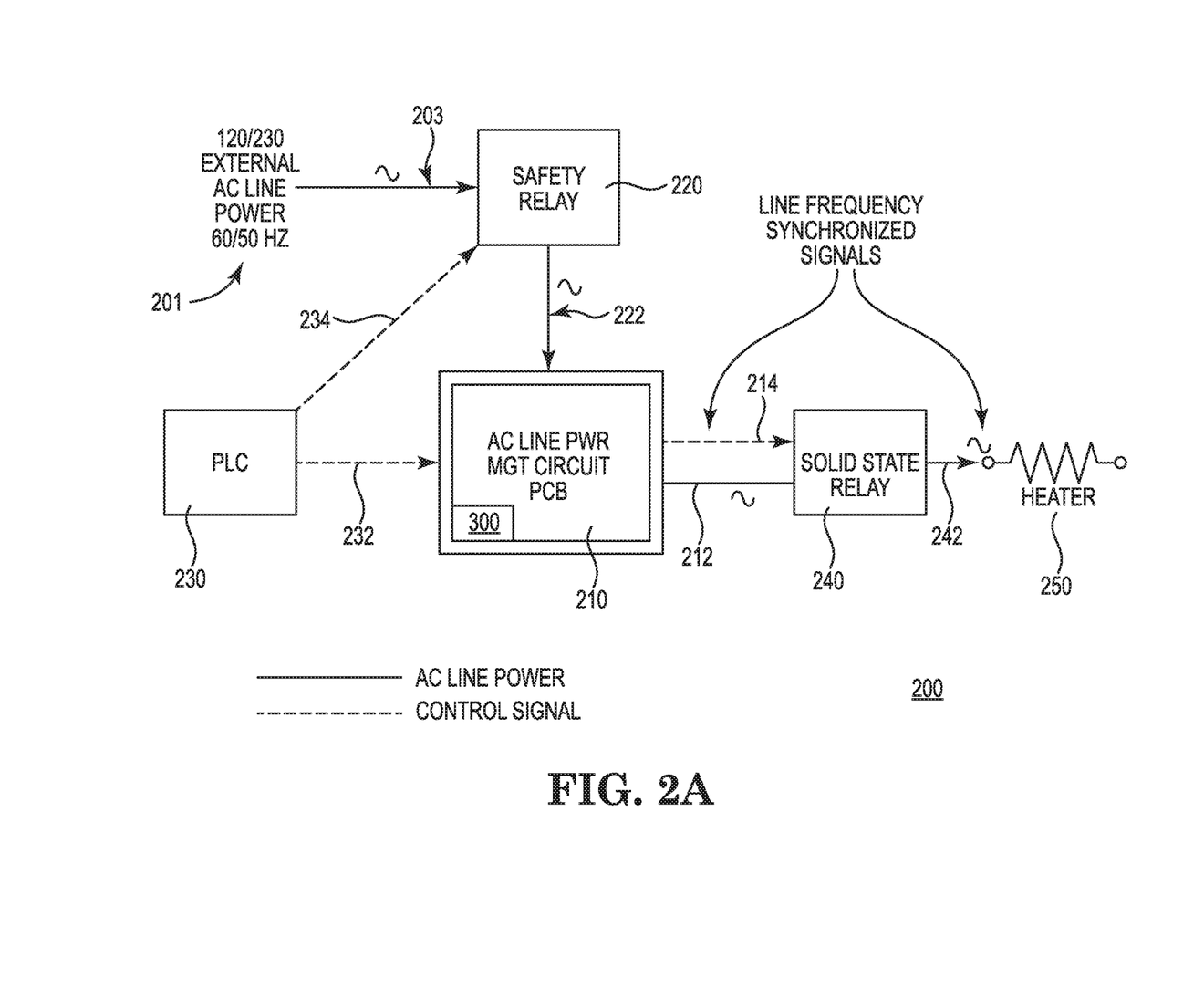
FIGS. 2A and 2B are schematic views of a first and second embodiment, respectively, of a heat power management system for devices and systems having a predefined load requirement.

Referring now to FIG. 2A, there is illustrated a schematic view of a first embodiment of a heat power management system 200 (which is power distribution module 16 in FIG. 1A) that provides alternating current power source and DC power source protection from variations in voltage and high current draws when using a heating element as a load in the system. This example embodiment allows a device or system using heat power management system 200 to connect to and protect global power systems providing power at either 115-120 volt or 230 volt and with frequencies at either 60 Hz or 50 Hz and an amperage of generally 15 amps or 7.5 amps. The various power line protection and isolation embodiments are particularly useful for portable water purification systems, such as reverse osmosis systems or chemical disinfection systems and can operate in a voltage range from 100V to 132V and 200V to 264V with an amperage range of about 7.5 amps to about 15 amps. In this example embodiment, an AC line power management system 200 is configured to control and limit a total power applied in a heating function of a heating element 250, having a predefined watt rating or a single watt rating, from an external AC power source 201 having a line voltage, a line frequency and a drive voltage waveform. In this example, the line voltage is either 120 volts or 230 volts and a line frequency of either 50 Hz or 60 Hz with primarily a sinusoidal waveform.

In this example embodiment, a safety contactor and relay assembly 220 is electrically coupled to external AC power source 201 via a line 203 and serves to isolate the heat power management system from, for instance, a heat sanitizing system of an RO water purification system. During a normal heating mode of the RO system, contactor 220 closes to provide such isolation and will also close to protect the power supply 11 or 201 should system 200 begin to draw too much current. Power management system 200 also prevents too much power and heat from being dissipated from the heating element and also reduces the electric noise and harmonics that may be produced in the power line. In this example embodiment, heat power management system 200 includes an AC line power management circuit 210 coupled to contactor and relay assembly 220 via line 222 and includes PCB 300 with a processor module 310 (discussed in the description of FIG. 3) electrically coupled to external AC power source 201 and is designed to sense whatever the AC line frequency, line voltage and the AC voltage waveform to which system 200 is connected. Power management circuit 210 is then able to control the AC voltage waveform to be applied to heating element 250 which may be located in the product or purified water conduit being delivered to the external heat device or the "no man's land" portion of the RO unit connection described earlier. In this example embodiment, system 200 further includes a master heating process controller 230 (e.g. programmable logic controller PLC) that is electrically coupled to power management circuit 210 and is designed to provide a control signal 232, in the form of a system control percent drive waveform, to power management circuit 210 which ultimately determines the amount of power to be provided to a heating element 250. Controller 230 is also electrically coupled to safety contactor relay assembly 220 and sends control signals 234 to close contactor 220 in an overheat or over current draw condition (provides current limiting protection of the heating element and the overall RO system). Hence, for a 120V/60 Hz system the upper limit is about 14 amps and for a 230/50 Hz system the upper limit is about 8 amps. System 200 further includes a solid state power relay 240 that is electrically coupled via a line 212 and communicatively coupled via control signal line 214 to power management circuit 210 and to safety contactor relay assembly 220. An output 242 of power relay 240 is electrically coupled to heating element 250 such that solid state power relay 240 can receive and provide a line frequency synchronized signal to heating element 250.

In this example embodiment, power management circuit 200 is programmed to automatically sync AC power source line frequency 201 and control percent drive signal 232 so as to control the drive signal 214 directed to heating element 250 via solid state power relay 240. In this example embodiment, solid state power relay 240 is able to control and limit power applied to heating element 250 and is also designed to be responsive to a line frequency synchronized percent drive signal. Master heating process controller 230 upon sensing a change in water temperature in the RO system sends a control signal 214 using pulse width modulation (around 10 KHz) to power up heater element 250. Solid state relay 240 chops up AC power (voltage) being applied to heater element 250. The result is the formation of a power corrected heater that eliminates harmonic disturbances in the line as the multiple miniature pulses mimic the wave form without introducing the harmonic distortions or noise on the line (hence these are line frequency synchronized signals). In the past, the system was only able to draw current at the peak of the sine waveform due to distorting the power/voltage and causing harmonics on the line. The power factor correction (PFC) of the present system forces current draw across the sine wave.

In this example embodiment, contactor 220 also closes and isolates the heating function (and heating element as well as the water heating circuit) during dialysis operation. PLC 230 actually signals contactor 220 to close before the heating function of the RO system commences. PLC 230 also shuts solid state relay 240 if too much heat is sensed at heater 250. Line 214 is a two wire system that controls relay 240 while line 212 is a single wire signal to circuit 210 that drives power to relay 240. In this example embodiment, master heating process controller 230 is also programmed to vary a master percent heating requirement based upon the heating function parameters of a fluid (such as water) to be heated or the requirements of heating element 250. Master heating process controller 230 is also programmed to provide phase control of the AC line voltage of power source 201 in coordination with safety contactor relay assembly 220. Further, the AC voltage applied to heater element 250 via circuit 210 can also be varied in response to control signals 232 integrated in the master heating process percent drive control signal. In a related embodiment, the AC voltage applied to a heat element is reduced in response to an AC line current draw for AC line voltages exceeding a predefined maximum level. Heating process controller 230 is configured to be responsive to a certain water temperature in a reverse osmosis water purification system and serves as a current limiter at the heating element.

Figure 2B:
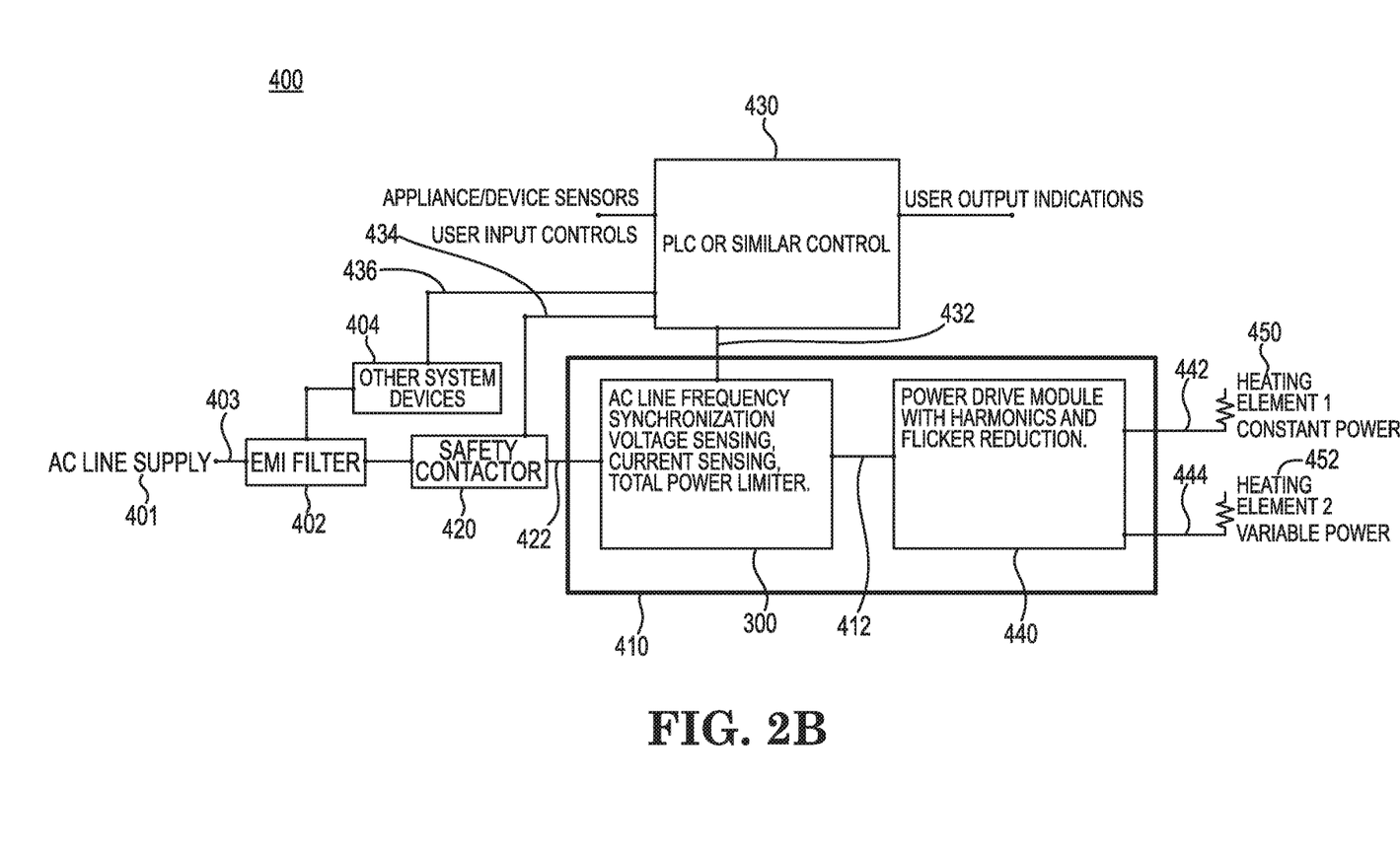

Referring now to FIG. 2B there is illustrated a schematic view of a second embodiment of a heat power management system 400 for devices and systems having a predefined load and a variable load requirement. In this example embodiment, an AC line power management system 400 is configured to control and limit a total power applied in a heating function of a heating element 450 having a defined load or watt rating and a heating element 452 having a variable load or watt rating, from an external AC power source 401 having a line voltage, a line frequency and a drive voltage waveform. In this example, the line voltage is either 115 volts or 230 volts and a line frequency of either 60 Hz or 50 Hz with primarily a sinusoidal waveform and an amperage range of 15 amps or 7.5 amps (depending on the system you are working in, U.S. or international). A safety contactor and relay assembly 420, which serves to isolate the heat power management system 400 from, for instance, a heat sanitizing system of an RO water purification system, is electrically coupled to external AC power source 401 via a line 403 and after an EMI filter (electromagnetic filter) 402. EMI filter 402 filters unwanted electromagnetic signals from contactor 420, other system devices 404 and ultimately from PLC 430 and power management circuit 410. During a normal heating mode of the RO system, safety contactor 420 closes to provide such isolation and will also close to protect power supply 11 or 401 should the heat power management system 400 begin to draw too much current. Power management system 400 also prevents too much power and heat from being dissipated from the heating elements and, along with a power drive or module 440, also reduces the electric noise and harmonics that may be produced in the power line.

In this example embodiment, heat power management system 400 includes an AC line power management circuit 410, coupled to contactor and relay assembly 420 via line 422, and includes a PCB with a processor module (similar to PCB 300 and processor 310 of FIG. 3) and a power module 440 electrically coupled to external AC power source 401 and is designed to sense whatever the AC line frequency, line voltage and the AC voltage waveform to which system 400 is connected. Circuit 410 is also configured to provide AC line frequency synchronization, voltage/current sensing and total power limiting capabilities. Power module 440 provides a power drive module with harmonics and flicker reduction capabilities. Power management circuit 410 is then able to control the AC voltage waveform to be applied to heating elements 450 and 452 which may be located in the product or purified water conduit being delivered to the external heat device.

In this example embodiment, a master heating process controller or PLC 430 that is electrically coupled to power management circuit 410 and which provides a control signal 432, in the form of a system control percent drive waveform, determines the amount of power to be provided to either heating element 450 or 452. Controller 430 is also electrically coupled to safety contactor relay assembly 420 and sends control signals 434 to close contactor 420 in an overheat or over current draw condition (provides current limiting protection of the heating elements and the overall RO system) as well as to other system devices 404 via signal 436. Hence, for a 120V/60 Hz system the upper limit is about 8 amps and for a 230/50 Hz system the upper limit is about 14 amps. System 400 further includes a solid state power module 440 that is electrically coupled via a line 412 to power control board 300. Power module 440 advantageously includes power drive harmonics and flicker reduction circuits for smoother and precise control of power to the respective heater elements. An output 442 of power module 440 is electrically coupled to heating element 450 and provides a line frequency synchronized signal to heating element 450 from circuit 300. Another output 444 of power module 440 is electrically coupled to heating element 452 having variable power requirements and also provides a line frequency synchronized signal to heating element 452 from circuit 300. Power management circuit 400 is programmed to automatically sync AC power source line frequency 401 and control percent drive signal 432 so as to control a drive signal directed to either heating elements 450 and 452 via solid state power module 440.

In this example embodiment, solid state power controller 440 is able to control and limit power applied to either heating elements and is also designed to be responsive to a line frequency synchronized percent drive signal. Upon sensing a change in water temperature in the RO system, heating process controller 430 sends a control signal using pulse width modulation (around 10 KHz) to adjust or correct power being applied to heater elements. Solid state power module 440 segments or chops up AC power (voltage) being applied to either heater element 450 or 452. The result is the formation of a power corrected heater that eliminates harmonic disturbances in the line as the multiple miniature pulses mimic the wave form without introducing the harmonic distortions or noise on the line (hence these are line frequency synchronized signals). Advantageously, the power factor correction (PFC) of the present system forces current draw across the sine wave versus prior art systems limited to only drawing current at the peak of the sine waveform due to distorting the power/voltage and causing harmonics on the line. PLC 430 signals contactor 420 to close before the heating function of the RO system commences and also signals power module 440 if too much heat is sensed at either of heater elements 450 or 452. In this example embodiment, heating process controller 430 is programmed to: a) vary a master percent heating requirement based upon the heating function parameters of a fluid (such as water) to be heated or the requirements of either of heating elements 450 or 452; and b) to provide phase control of the AC line voltage of power source 401 in coordination with safety contactor relay assembly 420. Further, the AC voltage applied to heater element 452 via circuit 410 can also be varied in response to control signals 432 integrated in the master heating process percent drive control signal. In a related embodiment, the AC voltage applied to a heat element is reduced in response to an AC line current draw for AC line voltages exceeding a predefined maximum level.

Figure 3:
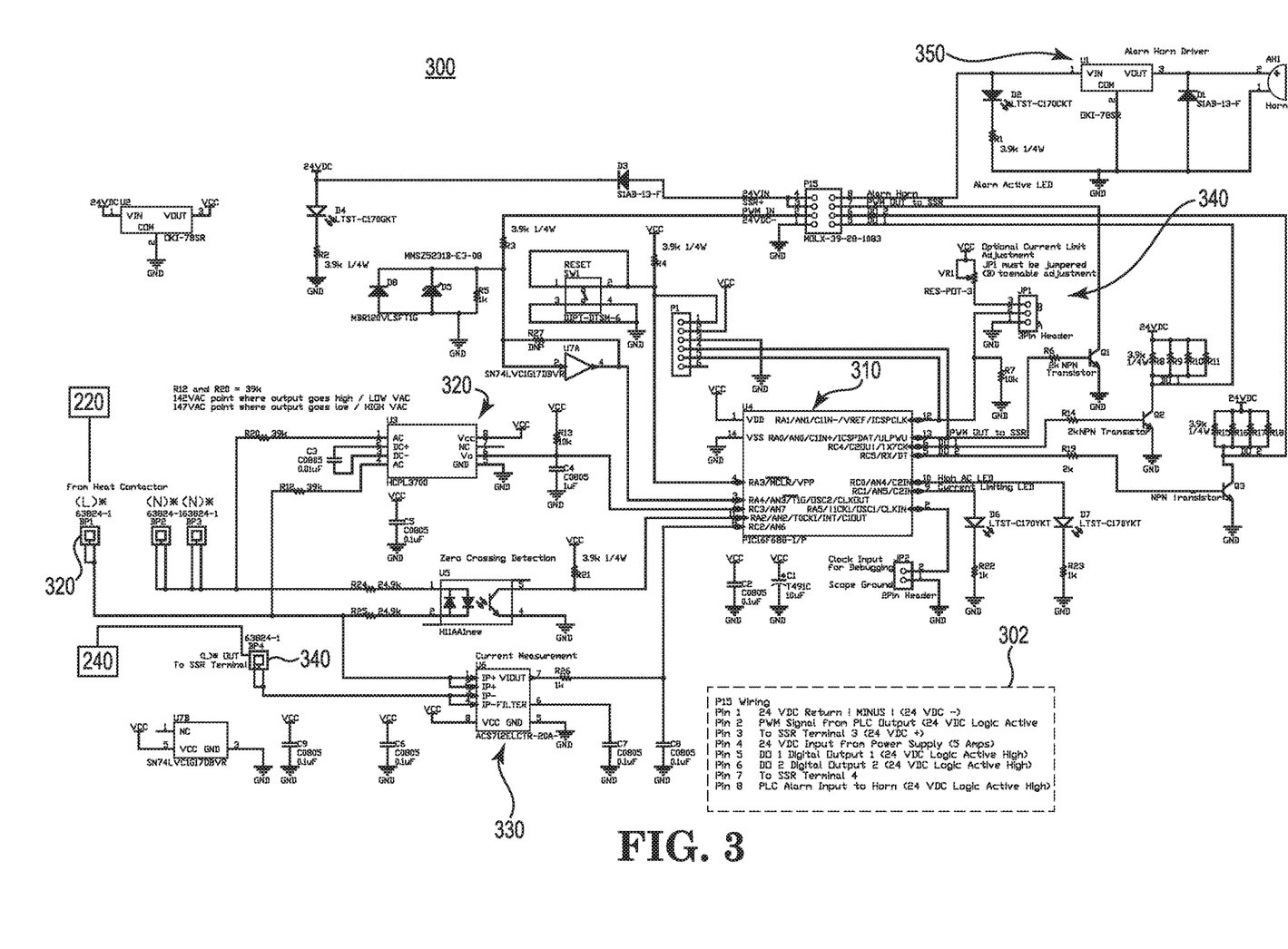
FIG. 3 is a schematic view of a power control and alarm circuit board forming part of the heat power management system according to the description of this disclosure.

Referring now to FIG. 3, there is illustrated a schematic view of a power control and alarm circuit board 300 with processor module 310 forming part of power management system 200 according to the teachings of the invention. In this example embodiment, processor module 310 controls various functions within board 300 (AC line power management circuit 200 of FIG. 2) including a voltage detection circuit 320 operatively coupled to processor module 310 and configured to sense the AC line voltage of external power source 201, with a contact point being provided for connection with contactor relay 220. Processor module 310 is also operatively coupled to a current measurement circuit 330 which is configured to sense a current level at heating element 250 (or whatever device or media is being heated) and is configured to provide a signal to reduce the current draw at heating element 250 when the AC line voltage exceeds a predefined maximum level.

Figure 4:
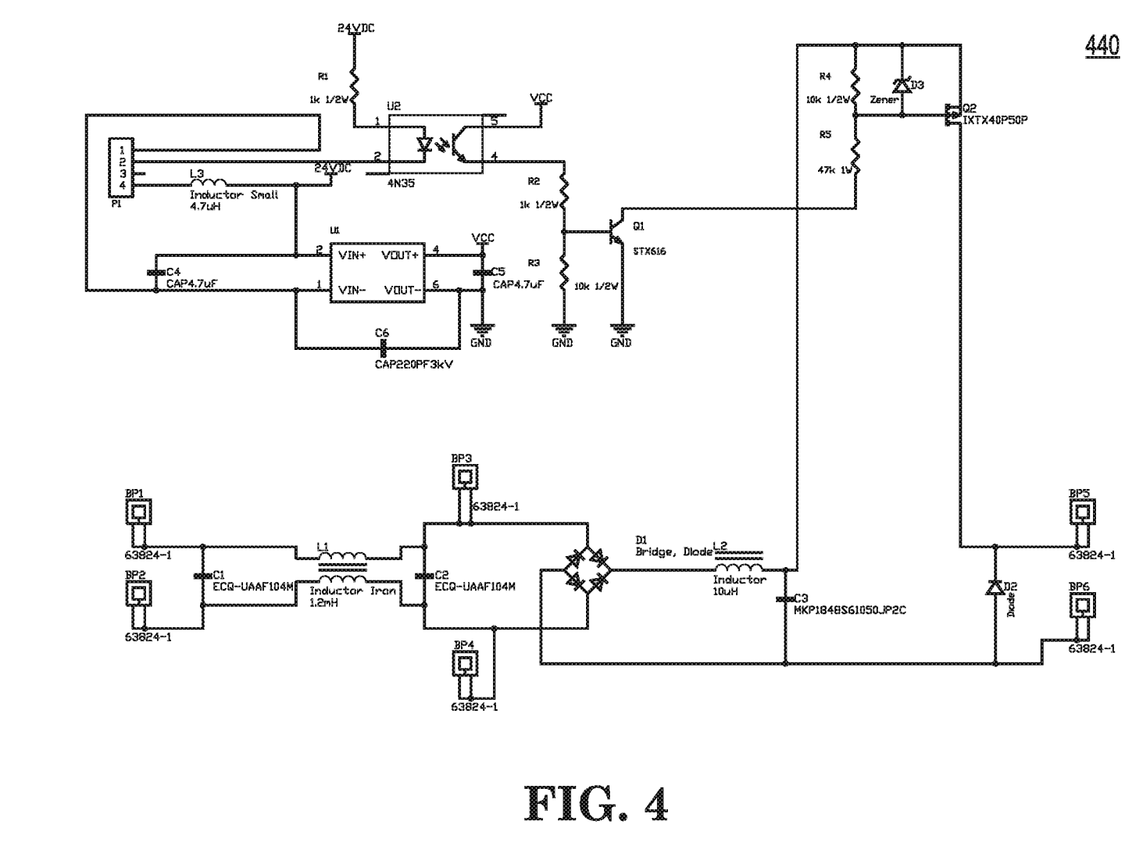
FIG. 4 is a schematic view of a power drive board which reduces or eliminates harmonics and flickering in a heat power management system according to the description of this disclosure.
Figure 5:
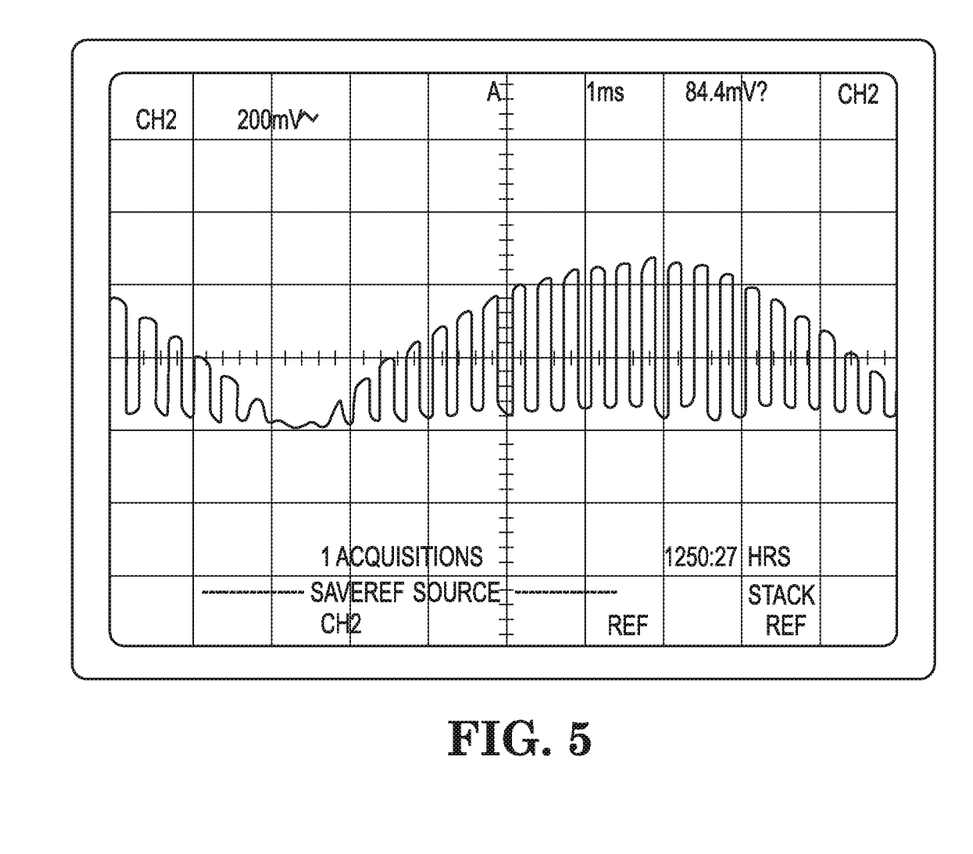
FIG. 5 is a graphical representation of a sine wave of a current formed from multiple pulses which mimic the sine wave form provided by the power drive board.

Referring now to FIGS. 4 and 5, in FIG. 4 there is illustrated a schematic view of a power drive board 440 which reduces or eliminates harmonics and flickering in a heat power management system while FIG. 5 is a graphical representation of a sine wave of a current formed from multiple pulses which mimic the sine wave form provided by power drive board or module 440. As discussed earlier, power management system 400 now prevents too much power and heat from being dissipated from the heating elements 450 and 452 as power drive or module 440 reduces the noise and harmonics that may be produced in the power line. Hence, there is an improvement in that less heat and wasted power is generated as the manner in which the FET device is now driven in power module 440. A closer review of FIG. 5 illustrates rectification of the AC line into a raw voltage waveform applied to the heating elements (showing how it is controlled and thus controls the current/power to the heating elements) which includes a series of bumps or pulses at the peak, formed by the chopping circuit and having a frequency of about 10 KHz, which collectively form the overall sine wave. The pulse width modulation (PWM) duty cycle control of the raw DC waveform results in total power control and power factor correction (PFC). PFC frequency (about 10 KHz) is selected for minimum harmonic distortion of the AC line with this action reducing or eliminating the flicker component in the AC line. Specifically, these peaks advantageously eliminate or substantially reduce flicker and harmonics and noise in the system as they fall in a range that is not viewed or detected by the power management system. Chopping speed depends on the power device and needs to be fast enough to switch on/off rapidly so as to generate the successive pulses or bumps to form the sine wave. The PFC now forces current to be drawn across the entire sine wave thereby providing good control of power to the respective heating elements and lowering the heat generated and wasted power in the RO unit device or housing.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. An alternating current (AC) line heat power management system for controlling and limiting a total power applied in a heating function of a heating assembly, having a predefined watt rating, from an external AC power source having a line voltage, a line frequency and a drive voltage waveform, the heat power management system comprising:

a safety contactor relay assembly electrically coupled to the external AC power source;

an AC line power management circuit electrically coupled to the safety contactor relay assembly, the AC line heat power management circuit including a processor module and a power module electrically coupled to the external AC power source senses the AC line frequency, line voltage and current, and an AC voltage waveform when the safety contactor is being energized, the line power management circuit providing a line frequency synchronized signal and control the AC voltage waveform to be applied to the heating assembly; and a master heating process controller electrically coupled to provide control signals to the power management circuit and to the safety contactor relay assembly, the master heating process controller providing a system control percent drive waveform signal to the power management circuit which determines the amount of power provided to the heating element;

wherein the power module controls the AC voltage waveform so as to reduce harmonics and flicker in the voltage waveform to be applied to the heater assembly, wherein the heating process controller is responsive to a certain water temperature in a reverse osmosis water purification system.

2. The power management system of claim 1 wherein the heating assembly includes a constant power heater element and a variable power heater element.

3. The power management system of claim 1 wherein the AC line power management circuit includes voltage detection circuit electrically coupled to the processor module to sense the AC line voltage of the external power source.

4. The power management system of claim 1 wherein the AC line power management circuit includes a current measurement circuit electrically coupled to the processor module to sense a current level at the heating element and provide a signal to reduce the current draw at the heating element when the AC line voltage exceeds a predefined maximum level.

5. A method for controlling a heating function of a sanitizing system for a reverse osmosis system and controlling a line voltage and line frequency supplied thereto from an external power source, the method comprising:

automatically converting the line voltage and frequency to a defined requirement of a load of the sanitizing system;

providing DC voltage to a part of the sanitizing system via a contactor and relay coupled to the external power source; and causing a programmable logic controller (PLC) to control amount of power provided to a heater assembly for heating purified water by varying a heat element resistance of the heater assembly to control a current draw to protect the external power source.

6. The method of claim 5 further comprising the step of activating a sanitizing cycle within the sanitizing system via a heating power management control circuit provide heated sanitized reverse osmosis water through the external device.

7. The method claim 5 further comprising the step of causing a power module to control the AC voltage waveform so as to reduce harmonics and flicker in the voltage waveform to be applied to the heater assembly, wherein the power module is coupled the programmable logic controller.

8. The method of claim 7, wherein the heating assembly includes a constant power heater element and a variable power heater element.

* * * * *